US012024250B2

(12) United States Patent
Friend et al.

(10) Patent No.: US 12,024,250 B2
(45) Date of Patent: Jul. 2, 2024

(54) FUEL TANK MOUNTING SYSTEM

(71) Applicant: Toyota Motor Engineering & Manufacturing North America, Inc., Plano, TX (US)

(72) Inventors: Ronald Scott Friend, Jeffersonville, KY (US); Brian McElroy, Winchester, KY (US); Robert A Allex, Ewing, KY (US); Christopher L Rexroat, Paris, KY (US); David L Brock, Versailles, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 260 days.

(21) Appl. No.: 17/824,771

(22) Filed: May 25, 2022

(65) Prior Publication Data

US 2023/0382478 A1 Nov. 30, 2023

(51) Int. Cl.
*B62D 65/02* (2006.01)
*B60K 15/067* (2006.01)

(52) U.S. Cl.
CPC .......... *B62D 65/026* (2013.01); *B60K 15/067* (2013.01)

(58) Field of Classification Search
CPC ............................ B62D 65/026; B60K 15/067
USPC ................ 248/554; 198/803.2; 29/784, 33 R
See application file for complete search history.

(56) References Cited

U.S. PATENT DOCUMENTS

| 4,827,598 A | * | 5/1989 | Sakamoto | B62D 65/02 29/430 |
| 4,875,280 A | * | 10/1989 | Fujioka | B62D 65/18 29/430 |
| 5,014,405 A | * | 5/1991 | Yamana | B23P 21/004 29/784 |
| 9,815,511 B2 | * | 11/2017 | Kilibarda | B62D 65/18 |
| 11,286,142 B2 | * | 3/2022 | Friend | B66F 7/20 |
| 2023/0382479 A1 | * | 11/2023 | Friend | B62D 65/026 |

FOREIGN PATENT DOCUMENTS

| CN | 202007100 U | 10/2011 |
| CN | 202474609 U | 10/2012 |
| CN | 202947709 U | 5/2013 |
| CN | 205147685 U | 4/2016 |
| CN | 208182483 U | 12/2018 |
| CN | 212351929 U | 1/2021 |
| CN | 212531354 U | 2/2021 |
| KR | 101302515 B1 | 9/2013 |

* cited by examiner

*Primary Examiner* — Anita M King
(74) *Attorney, Agent, or Firm* — Snell & Wilmer LLP

(57) ABSTRACT

A fuel tank mounting system for allowing mounting of a fuel tank to a vehicle during assembly of the vehicle. A movable base moves along tracks on an assembly line and supports a fuel tank adjacent to a vehicle. Movable fastener drivers move to align with corresponding fastener apertures on the vehicle and drive fasteners to attach the fuel tank to the vehicle. Because the fastener drivers are movable, the system may be reconfigured to mount different fuel tanks to different vehicles needing differently aligned and/or differently angled fasteners.

20 Claims, 8 Drawing Sheets

FUEL TANK MOUNTING SYSTEM

BACKGROUND

Field

This disclosure relates to a fuel tank mounting system for vehicles to attach fuel tanks to vehicles. The system may be utilized with an assembly line.

Description of the Related Art

Fuel tanks are mounted to vehicles during a manufacturing process. Frequently, mounting a fuel tank involves aligning fuel tank fasteners to corresponding threaded apertures on a vehicle frame, and threading the fasteners into the apertures. Due to the differing shapes and sizes of fuel tanks and vehicle frames, the fasteners may be arranged in differing ways, including being oriented at arbitrary angles relative to each other.

In an assembly line environment, standardization of tools and processes facilitates improved production throughput and reduced assembly errors. Thus, there is a need for a system and method to align fuel tank fasteners and properly position both the fasteners and the fuel tank, as well as to tighten the fasteners, while also addressing the different arrangements and orientations of fasteners required depending on which model of vehicle is being assembled on the assembly line. There is a need for a standardized machine that can be used on an assembly line to assemble different tanks to different vehicle frames having different configurations, without changing the machine.

SUMMARY

A fuel tank mounting system is provided. The fuel tank mounting system may include a movable base, a first driver pair assembly, a second driver pair assembly, and a tank support assembly. The movable base may be a frame that is movable along tracks. The first driver pair assembly may be attached to the movable base and may be configured to fasten a first plurality of fuel tank fasteners. The second driver pair assembly may be attached to the movable base and may be configured to fasten a second plurality of fuel tank fasteners. The tank support assembly may be a tank support assembly disposed between the first driver pair assembly and the second driver pair assembly and may be configured to support a fuel tank during fastening of the first plurality of fuel tank fasteners and the second plurality of fuel tank fasteners.

The first driver pair assembly may include a first carrier arm, a first forward fastener driver, and a first aft fastener driver. The first carrier arm may have a first forward lifting actuator and a first aft lifting actuator disposed adjacent to opposite ends of the first carrier arm. The first forward fastener driver may be supported by the first forward lifting actuator and may be rotatable to drive a first fuel tank fastener during fastening of the fuel tank to a vehicle. The first aft fastener driver may be supported by the first aft lifting actuator and may be rotatable to drive a second fuel tank fastener during fastening of the fuel tank to the vehicle.

A first forward support finger may be provided. The first forward support finger may be a flange securing the first forward lifting actuator to the first carrier arm slidably along a track. A first aft support finger may be provided. The first aft support finger may be a flange securing the first aft lifting actuator to the first carrier arm slidably along the track.

A first carrier arm travel actuator may be provided. The first carrier arm travel actuator may be a hydraulic arm extendable along a first carrier arm travel path to move at least one of the first forward lifting actuator and the first aft lifting actuator toward and away the other at least one of the first forward lifting actuator and the first aft lifting actuator slidably along the track of the first carrier arm.

In various embodiments, the first forward lifting actuator includes a hydraulic arm extendable along a first forward lifting actuator extension direction to raise and lower the first forward fastener driver relative to the movable base. Moreover, the first aft lifting actuator includes a hydraulic arm extendable along a first aft lifting actuator extension direction to raise and lower the first aft fastener driver relative to the movable base. The first forward lifting actuator extension direction and the first aft lifting actuator extension direction may not be arranged in parallel directions.

The system may have a first carrier arm pitch actuator. The first carrier arm pitch actuator may be a hydraulic actuator configured to rotate the first carrier arm around a first carrier arm pitch axis to angle the first forward fastener driver and the first aft fastener driver relative to a horizontal plane.

The second driver pair assembly may include a second carrier arm, a second forward fastener driver, and a second aft fastener driver. The second carrier arm may have a second forward lifting actuator and a second aft lifting actuator disposed adjacent to opposite ends of the second carrier arm. The second forward fastener driver may be supported by the second forward lifting actuator and may be rotatable to drive a third fuel tank fastener during fastening of the fuel tank. The second aft fastener driver may be supported by the second aft lifting actuator and may be rotatable to drive a fourth fuel tank fastener during fastening of the fuel tank.

A first carrier arm yaw actuator may be provided. The first carrier arm yaw actuator may be a hydraulic actuator configured to rotate the first carrier arm around a first carrier arm yaw axis to position the first forward fastener driver nearer or farther from the second forward fastener driver and to position the first aft fastener driver farther or nearer from the second aft fastener driver.

Finally, the tank support assembly may have various aspects. The tank support assembly may have a tank lifting actuator and a tank platform. The tank lifting actuator may selectably raise and lower the tank platform relative to the movable base. The tank platform may include a boss structured and arranged to receive a fuel tank resting thereon and support the fuel tank for raising and lowering by the tank lifting actuator.

A further example embodiment of a fuel tank mounting system may include a plurality of arms, a plurality of fastener drivers, a plurality of actuators, and a tank support assembly. The plurality of arms may be supported by a movable base. The plurality of fastener drivers may be spaced along each of the plurality of arms. At least two fastener drivers are spaced along each arm of the plurality of arms. The plurality of actuators may be connected to the arms to change at least two of (i) a spacing, (ii) an angle, and/or (iii) a height of each fastener driver relative to each other fastener driver. The tank support assembly may be disposed between at least two of the plurality of arms and may be configured to support a fuel tank while the fastener drivers drive fasteners to secure the fuel tank to a vehicle.

The plurality of arms may include a first arm and a second arm spaced apart on opposite sides of the tank support assembly. The plurality of fastener drivers may include two fastener drivers spaced along the first arm and two fastener drivers spaced along the second arm. The fastener drivers may be rivet guns. The fastener drivers may be rotating drivers to drive screws or bolts. The first arm and the second arm may be independently movable by actuators. The plurality of fastener drivers may be two fastener drivers spaced along the first arm and independently movable by actuators relative to each other, as well as two fastener drivers spaced along the second arm and independently movable by actuators relative to each other. The further actuators may independently move the first arm and the second arm relative to each other.

A method of assembling a fuel tank to a vehicle by a fuel tank mounting system is provided. The system may have (i) a movable base that is movable along tracks, (ii) a first driver pair assembly attached to the base and configured to fasten a first plurality of fuel tank fasteners, (iii) a second driver pair assembly attached to the base and configured to fasten a second plurality of fuel tank fasteners, and (iv) a tank support assembly disposed between the first driver pair assembly and the second driver pair assembly and configured to support a fuel tank during fastening of the first plurality of fuel tank fasteners and the second plurality of fuel tank fasteners. The method may include supporting a fuel tank on the tank support assembly. The method may include independently moving a first forward fastener driver of the first driver pair assembly, a first aft fastener driver of the first driver pair assembly, a second forward fastener driver of the second driver pair assembly, and a second aft fastener driver of the second driver pair assembly to align (i) the first forward fastener driver with a corresponding first threaded aperture of a vehicle, (ii) the first aft fastener driver with a corresponding second threaded aperture of the vehicle; (iii) the second forward fastener driver with a corresponding third threaded aperture of the vehicle; and (iv) the second aft fastener driver with the corresponding fourth threaded aperture of the vehicle.

The method may include lifting aspects. The method may include lifting the first forward fastener driver of the first driver pair assembly to drive a first fastener associated with the fuel tank into the corresponding first threaded aperture of the vehicle over a first time duration. The method may include lifting the first aft fastener driver of the first driver pair assembly to drive the second fastener associated with the fuel tank into a corresponding second threaded aperture of the vehicle over a second time duration. The method may include lifting the second forward fastener driver of the second driver pair assembly to drive a third fastener associated with the fuel tank into a corresponding third threaded aperture of the vehicle over a third time duration. The method may include lifting a second aft fastener driver of the second driver pair assembly to drive a fourth fastener associated with the fuel tank into a corresponding fourth threaded aperture of the vehicle over a fourth time duration. In various embodiments, the first time duration, the second time duration, the third time duration, and the fourth time duration are at least partially temporally overlapping.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure.

DETAILED DESCRIPTION

Disclosed herein are systems for mounting a fuel tank to a vehicle during assembly of the vehicle. In various embodiments, a movable base travels along an assembly line. The base supports multiple fastener drivers that can extend and move in order to align properly to secure the fuel tank to the vehicle with fastener. The base also supports a platform to hold the fuel tank and to raise the fuel tank to the vehicle for fastening by the fastener drivers. Because each fastener driver can be raised and lowered and can also move, the fasteners can be aligned to fasten fuel tanks of different sizes and shapes onto different types of vehicles.

Figure 1:
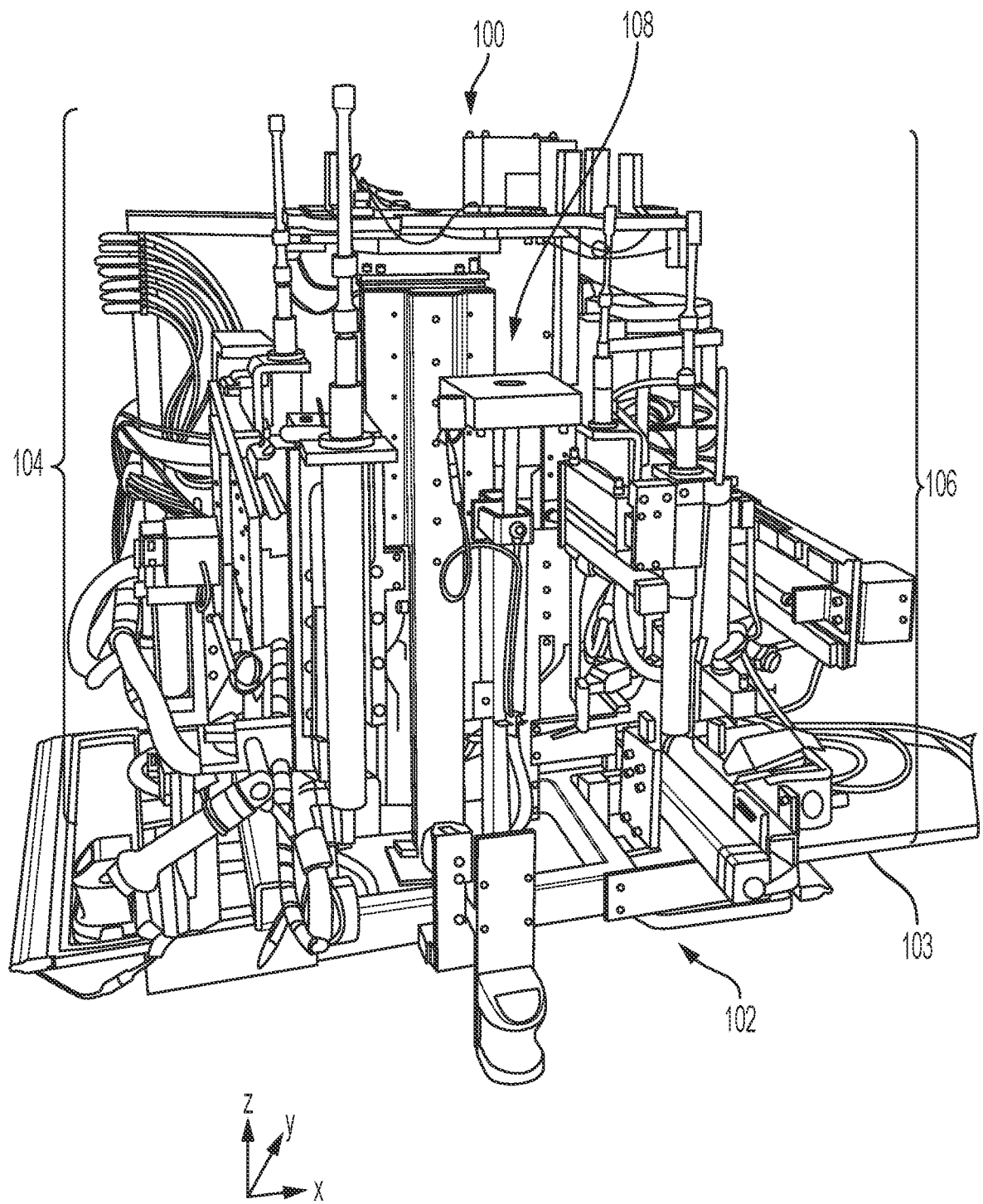
FIG. 1 illustrates a first side view of a fuel tank mounting system illustrating primary components of the fuel tank mounting system, in accordance with various embodiments.

With reference to FIG. 1, a fuel tank assembly system 2 may include a movable base 102 that travels along base tracks 103. The movable base 102 may support multiple assemblies of fastener drivers. For instance, a first driver pair assembly 104 may be disposed adjacent an end of the movable base 102 and a second driver pair assembly 106 may be disposed adjacent an opposite end of the movable base 102. The first driver pair assembly 104 may be configured to attach a first plurality of fuel tank fasteners. Similarly, the second driver pair assembly 106 may be configured to attach a second plurality of fuel tank fasteners. A tank support assembly 108 may be disposed between the first driver pair assembly 104 and the second driver pair assembly 106. The tank support assembly 108 may support a fuel tank during fastening of the first plurality of fuel tank fasteners and the second plurality of fuel tank fasteners. For instance, a fuel tank may be rested atop the tank support assembly 108, then lifted into position under a vehicle passing overhead on an assembly line. Once the tank support assembly 108 is positioned under the vehicle and supporting the fuel tank in place, then the first driver pair assembly 104 and the second driver pair assembly 106 may raise and move, each orienting two fasteners (e.g., a pair) in proper alignment with apertures on the vehicle and driving the fasteners into the apertures. Then the tank support assembly 108 and the first driver pair assembly 104 and second driver pair assembly 106 may lower away from the vehicle, leaving the fuel tank in place secured to the vehicle. While reference is made to a "driver pair assembly" for convenience throughout this disclosure, one may appreciate that different numbers of fasteners other than a pair of fasteners may be oriented and installed by the first driver pair assembly 104 and/or the second driver pair assembly 106.

Figure 2:
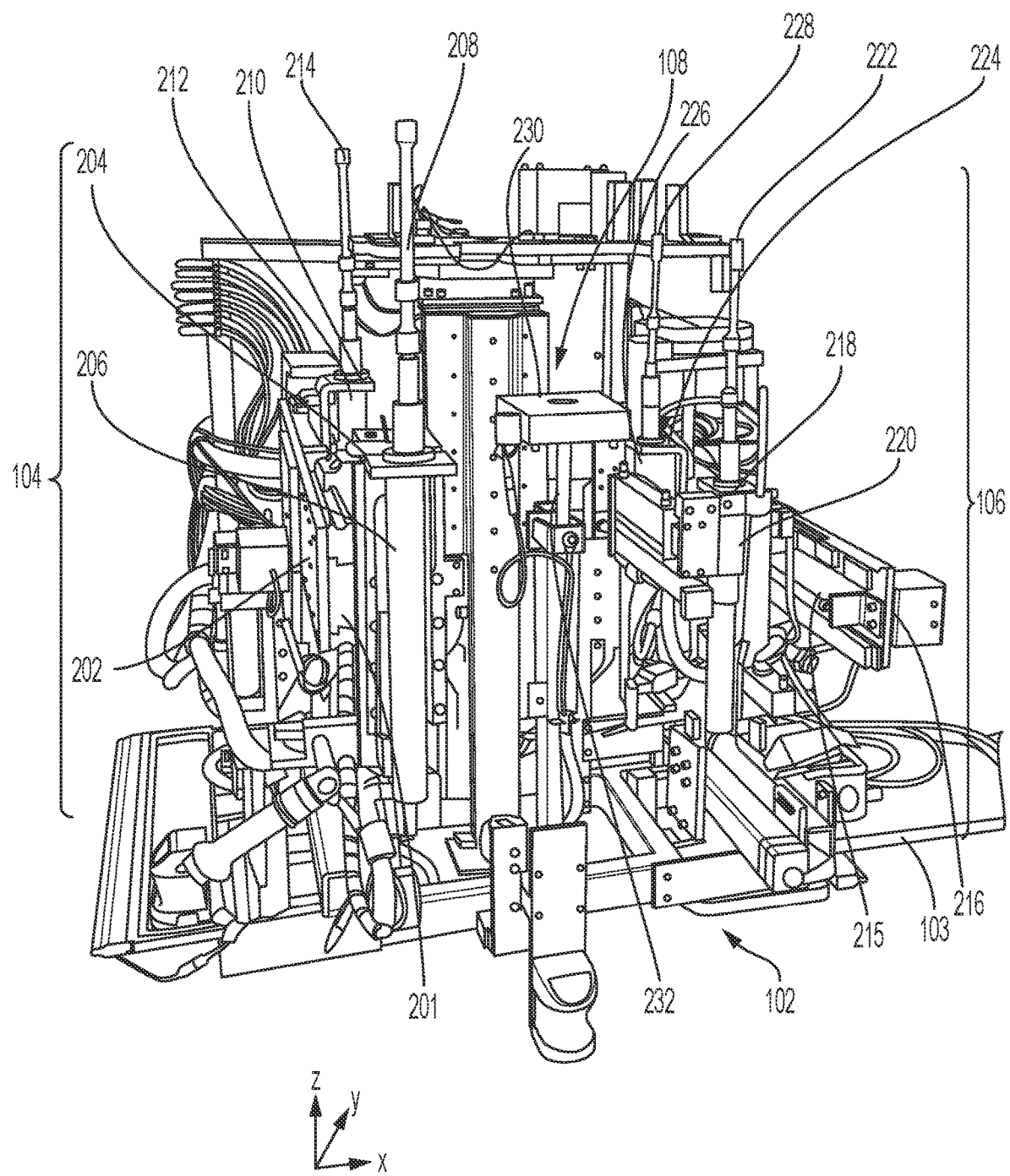
FIG. 2 illustrates the first side view of the fuel tank mounting system illustrating detailed component aspects of the fuel tank mounting system, in accordance with various embodiments.

Turning to FIG. 2, various more specific features of each of the first driver pair assembly 104, the second driver pair assembly 106 and the tank support assembly 108 are disclosed. For instance, in some embodiments, the movable base 102 travels along base tracks 103 extending in a X-axis direction so that the base travel path 322 (FIG. 3) runs parallel to an X-axis. In such an embodiment, the first driver pair assembly 104 is oriented toward a negative-X axis end of the movable base 102 and the second driver pair assembly 106 is oriented toward a positive-X axis end of the movable base 102. The tank support assembly 108 may be disposed in a space between the first driver pair assembly 104 and the second driver pair assembly 106, with the first driver pair assembly 104 on a negative-X axis side of the tank support assembly 108 and the second driver pair assembly 106 on a positive-X axis side of the tank support assembly 108.

The first driver pair assembly 104 may include a first carrier arm 202. The first carrier arm 202 may be an arm that extends generally perpendicular to the base travel path 322 (FIG. 3) of the movable base 102 as it travels along base tracks 103. In other words, the first carrier arm 202 may extend in a Y-axis direction. Stated another way, the first carrier arm 202 may extend along a side of the tank support assembly 108. The first carrier arm 202 may carry fastener drivers. More specifically, the first carrier arm 202 may have slidable fingers that slide along the first carrier arm 202. The slidable fingers carry actuators that support fastener drivers. The actuators raise and lower fastener drivers connected to the actuators while the slidable fingers slide along the first carrier arm 202 to translate the fastener drivers. In this manner, the first carrier arm 202 both carries fastener drivers and accommodates various spacing between the fastener drivers, but also accommodates the carried fastener drivers being disposed relatively higher or lower relative to the first carrier arm 202. Stated another way, the first carrier arm 202 may have a first forward lifting actuator 206 and a first aft lifting actuator 212 disposed adjacent to opposite ends of the first carrier arm 202. A first forward fastener driver 208 may be supported by the first forward lifting actuator 206 and may be rotatable to drive a first fuel tank fastener during fastening of the fuel tank to a vehicle. The first carrier arm 202 may have a first aft fastener driver 214 supported by the first aft lifting actuator 212 and also rotatable to drive a second fuel tank fastener during fastening of the fuel tank to the vehicle.

The first carrier arm 202 may have a track 201 running along a length of the first carrier arm 202. A first forward support finger 204 comprises a flange slidably attachable to the track 201 and a first aft support finger 210 also comprises a flange slidably attachable to the track 201. As used herein "aft" means disposed in a positive-Y axis direction and "forward" means disposed in a negative-Y axis direction. Aft and forward may denote being disposed toward opposite ends of a same side of the tank support assembly 108.

The first forward support finger 204 supports a first forward lifting actuator 206, such as a hydraulic actuator, an electrical motor actuator, a linear actuator, or any actuator. The first support finger also supports a first forward fastener driver 208 that is raised or lowered by the first forward lifting actuator 206. The first forward fastener driver 208 is a rotating fastener driver, or a rivet gun, or any fastener driver as desired. Thus, the first forward support finger 204 comprises a flange securing the first forward lifting actuator 206 to the first carrier arm 202 slidably along a track 201.

Similarly, the first aft support finger 210 supports a first aft lifting actuator 212, such as a hydraulic actuator, an electrical motor actuator, a linear actuator, or any actuator. The first support finger also supports a first aft fastener driver 214 that is raised or lowered by the first aft lifting actuator 212. The first aft fastener driver 214 is a rotating fastener driver, or a rivet gun, or any fastener driver as desired. Thus, the first aft support finger 210 comprises a flange securing the first aft lifting actuator 212 to the first carrier arm 202 slidably along the track 201.

The second driver pair assembly 106 may include a second carrier arm 216. The second carrier arm 216 may be an arm that extends generally perpendicular to the base travel path 322 (FIG. 3) of the movable base 102 as it travels along base tracks 103. In other words, the second carrier arm 216 may extend in a Y-axis direction. Stated another way, the second carrier arm 216 may extend along a side of the tank support assembly 108. The second carrier arm 216 may carry fastener drivers. More specifically, the second carrier arm 216 may have slidable fingers that slide along the second carrier arm 216. The slidable fingers carry actuators that support fastener drivers. The actuators raise and lower fastener drivers connected to the actuators while the slidable fingers slide along the second carrier arm 216 to translate the fastener drivers. In this manner, the second carrier arm 216 both carries fastener drivers and accommodates various spacing between the fastener drivers, but also accommodates the carried fastener drivers being disposed relatively higher or lower relative to the second carrier arm 216. Stated another way, the second carrier arm 216 may have a second forward lifting actuator 220 and a second aft lifting actuator 226 disposed adjacent to opposite ends of the second carrier arm 216. A second forward fastener driver 222 may be supported by the second forward lifting actuator 220 and may be rotatable to drive a third fuel tank fastener during fastening of the fuel tank to a vehicle. The second carrier arm 216 may have a second aft fastener driver 226 supported by the second aft lifting actuator 226 and also rotatable to drive a fourth fuel tank fastener during fastening of the fuel tank to the vehicle.

Turning now to the specific example embodiment of FIG. 2, the second carrier arm 216 may have a track 215 running along a length of the second carrier arm 216. A second forward support finger 218 comprises a flange slidably attachable to the track 201 and a second aft support finger 224 also comprises a flange slidably attachable to the track 215.

The second forward support finger 218 supports a second forward lifting actuator 220, such as a hydraulic actuator, an electrical motor actuator, a linear actuator, or any actuator. The second forward support finger 218 also supports a second forward fastener driver 222 that is raised or lowered by the second forward lifting actuator 220. The second forward fastener driver 222 is a rotating fastener driver, or a rivet gun, or any fastener driver as desired. Thus, the second forward support finger 218 comprises a flange securing the second forward lifting actuator 220 to the second carrier arm 216 slidably along the track 215.

Similarly, the second aft support finger 224 supports a second aft lifting actuator 226, such as a hydraulic actuator, an electrical motor actuator, a linear actuator, or any actuator. The second aft support finger 224 also supports a second aft fastener driver 226 that is raised or lowered by the second aft lifting actuator 226. The second aft fastener driver 226 is a rotating fastener driver, or a rivet gun, or any fastener driver as desired. Thus, the second aft support finger 224 comprises a flange securing the second aft lifting actuator 226 to the second carrier arm 216 slidably along the track 215.

The tank support assembly 108 may include a tank platform 230. The tank platform 230 comprises a boss structured and arranged to support a fuel tank resting atop the tank platform 230. The tank support assembly 108 may include a tank lifting actuator 232, such as a hydraulic actuator, an electrical motor actuator, a linear actuator, or any actuator. The tank lifting actuator 232 may extend to raise or contract to lower the tank platform 230, correspondingly raising or lowering a fuel tank resting atop the tank platform 230.

Figure 3:
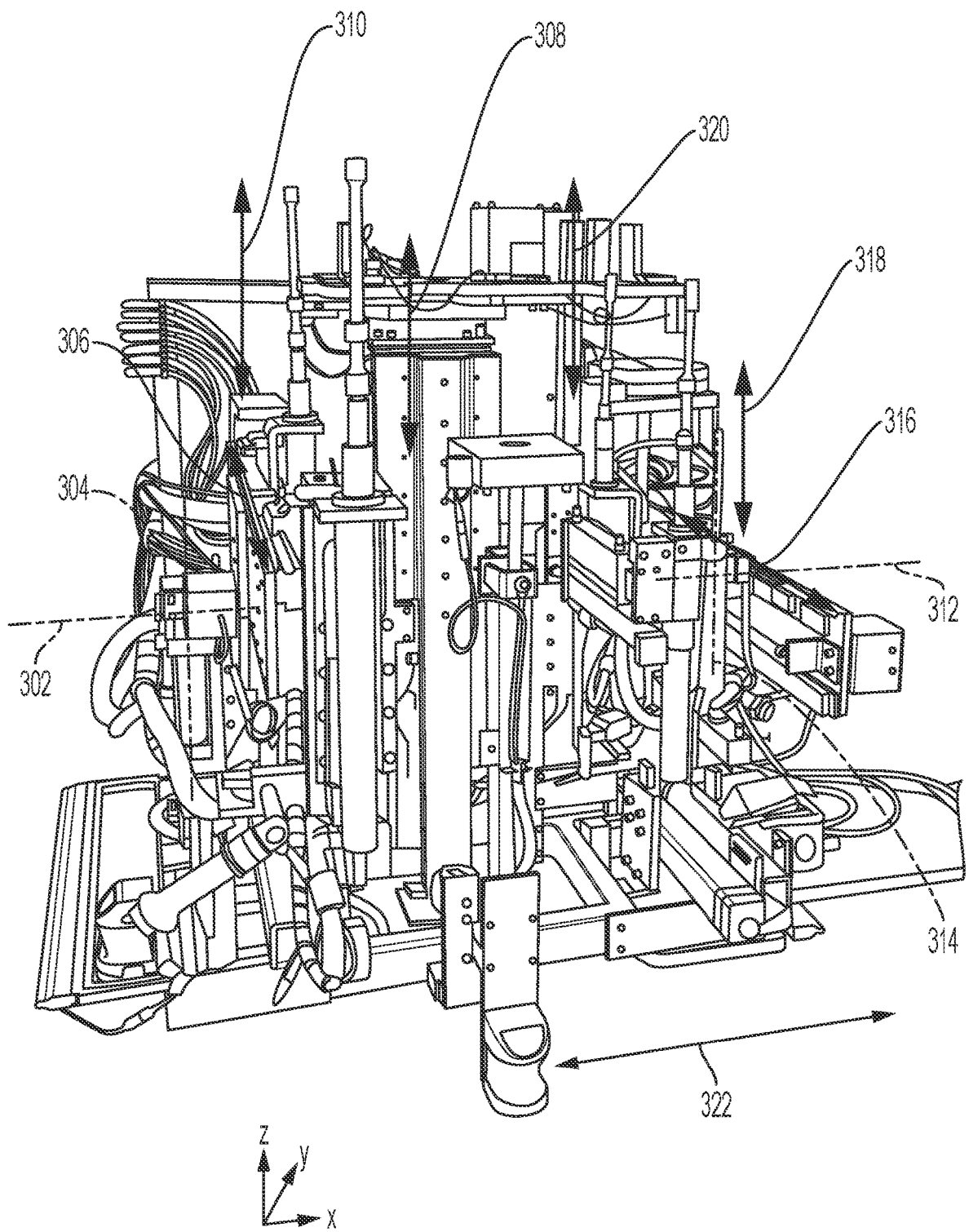
FIG. 3 illustrates the first side view of the fuel tank mounting system illustrating different axes, and directions and paths along which different aspects of the system may move and articulate, in accordance with various embodiments.

Turning now to both FIGS. 2 and 3, various actuators may cause aspects of the first driver pair assembly 104 and the second driver pair assembly 106 to move in different directions. While reference has been made to aspects extending in various axial directions, such as an X-axis or a Y-axis direction, the various actuators may move different aspects so that rather than extending parallel or perpendicular to such axial directions, the aspects extend at different angles relative to axial directions.

Figure 4:
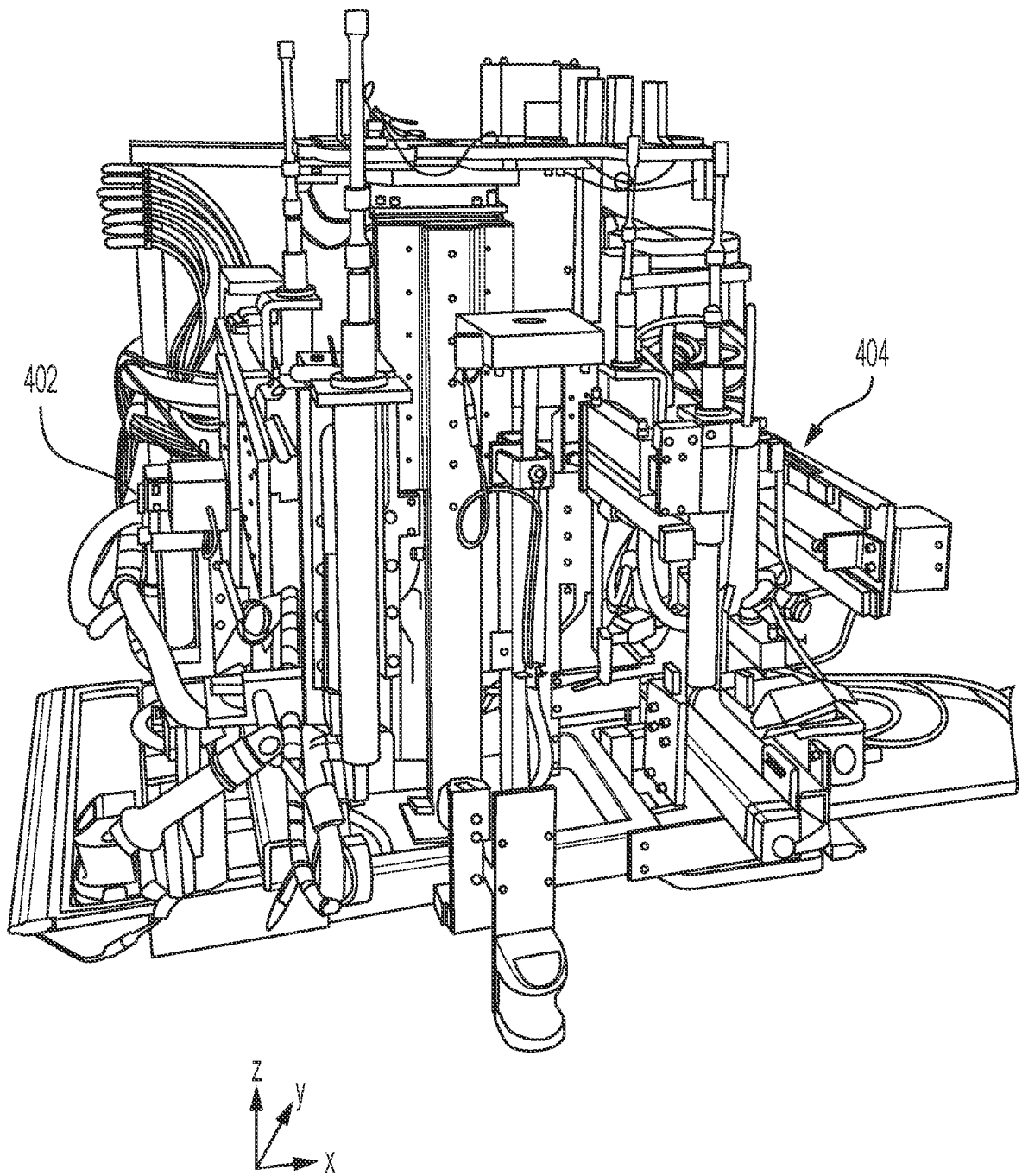
FIG. 4 illustrates the first side view of the fuel tank mounting system with emphasis on the carrier arm actuators of the system, in accordance with various embodiments.
Figure 6:
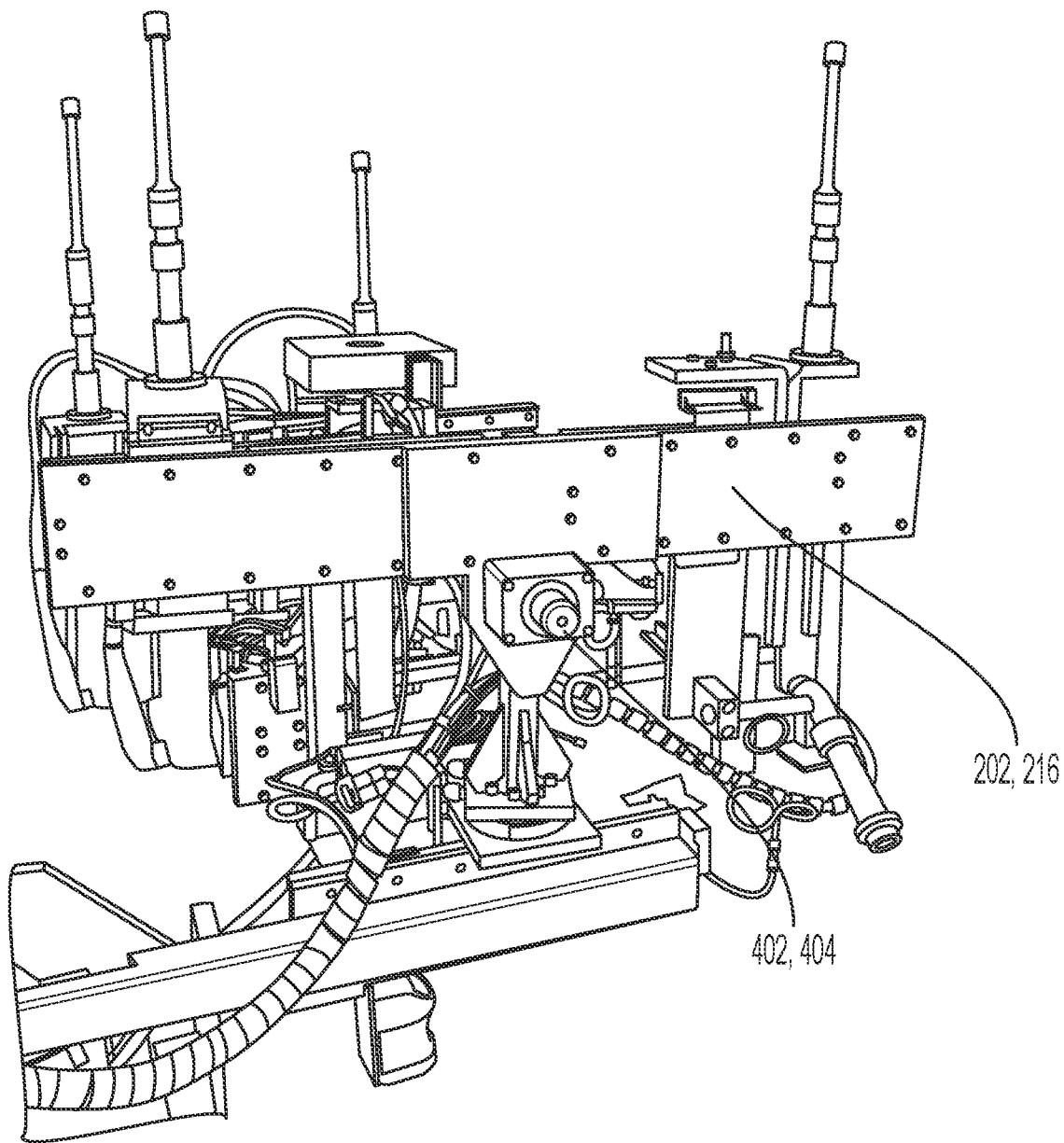
FIG. 6 illustrates a side view of a carrier arm of the fuel tank mounting system, in accordance with various embodiments.

Focusing now on the first driver pair assembly 104, the first carrier arm 202 of the first driver pair assembly 104 can pitch about a first carrier arm pitch axis 302 so that one end is disposed higher (further in a positive Z-axis direction) and the other end is disposed lower (further in a negative Z-axis direction). The first carrier arm pitch actuator 402 (FIGS. 4 and 6) rotates the first carrier arm 202 around the first carrier arm pitch axis 302 to angle the first forward fastener driver 208 and the first aft fastener driver 214 relative to a horizontal plane (e.g., X-Y plane). In this manner, a first forward fastener driver 208 and a first aft fastener driver 214 may be disposed at different Z-axis elevations relative to the movable base 102. A first carrier arm pitch actuator 402 (FIGS. 4 and 6) may connect to the first carrier arm 202 to cause the first carrier arm 202 to pitch about the first carrier arm pitch axis 302. The first carrier arm pitch actuator 402 (FIGS. 4 and 6) may be a rotational actuator such as a hydraulic actuator, an electrical motor actuator, a linear actuator, or any actuator as desired.

Figure 5:
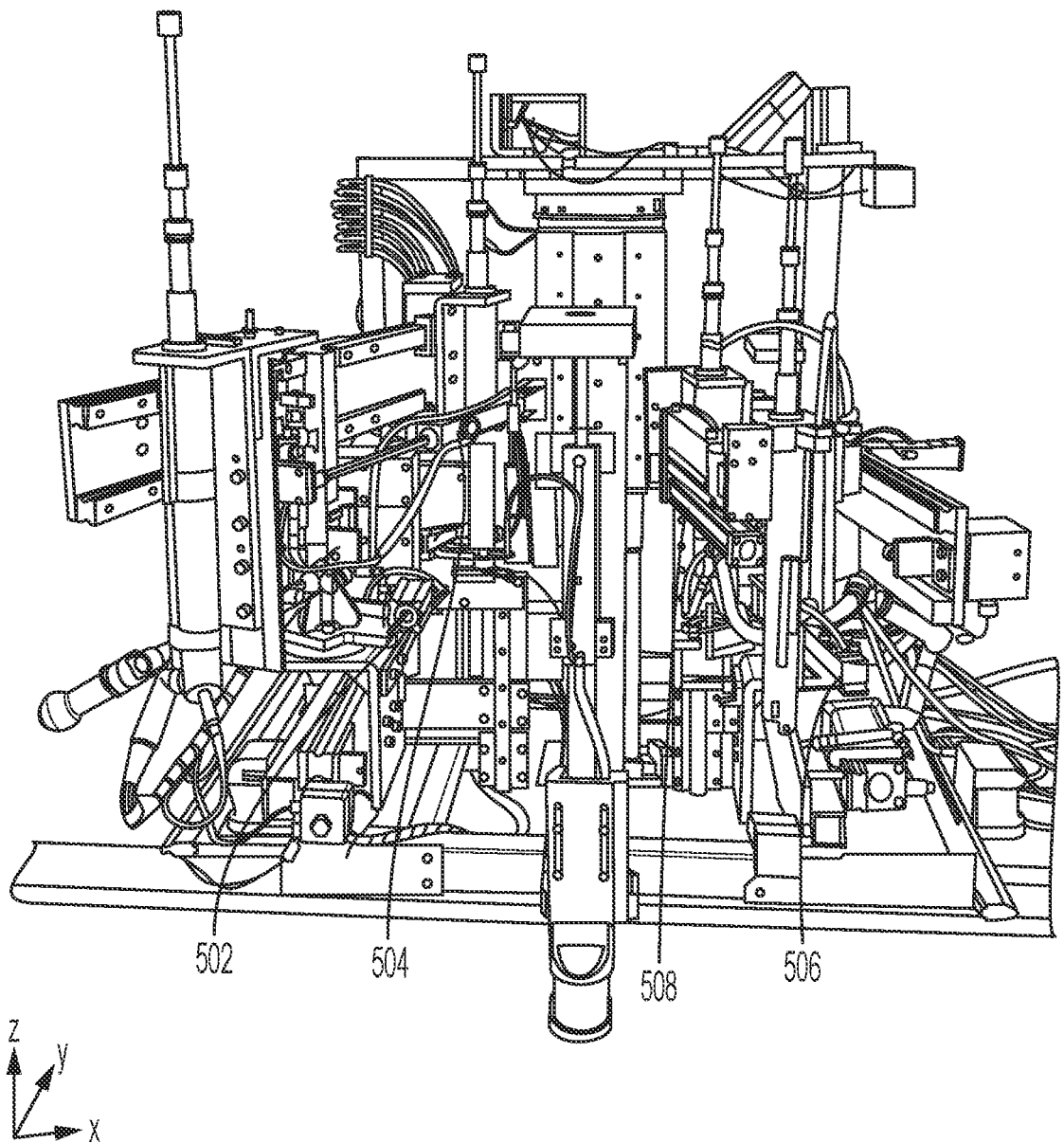
FIG. 5 illustrates a second side view of the fuel tank mounting system with various actuators extended to allow visibility for additional components thereof and with emphasis on various actuators of the system, in accordance with various embodiments.
Figure 7:
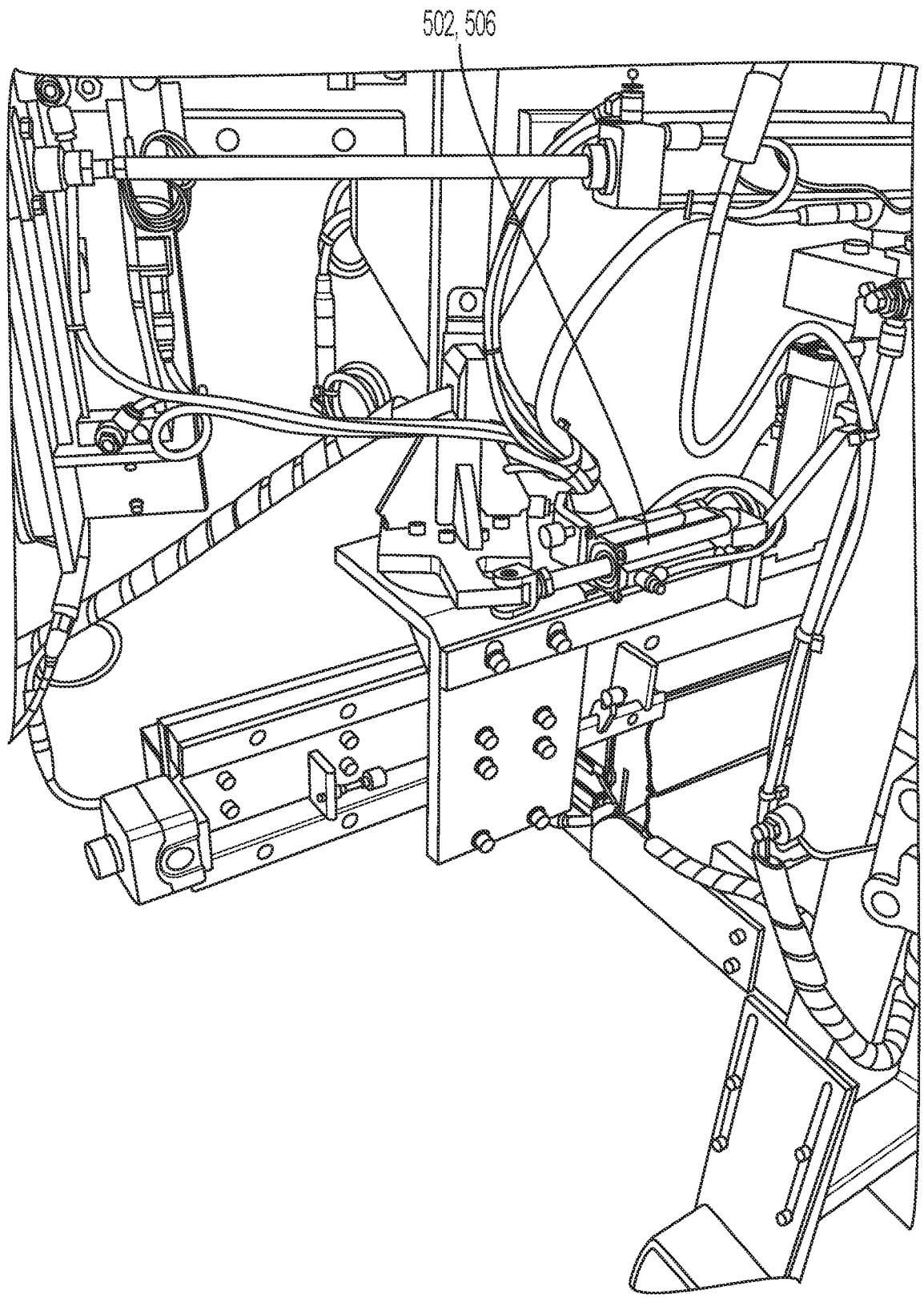
FIG. 7 illustrates a view of a carrier arm yaw actuator of the fuel tank mounting system, in accordance with various embodiments.

The first carrier arm 202 of the first driver pair assembly 104 can yaw about a first carrier arm yaw axis 304 so that one end is disposed closer (further in a positive X-axis direction) and the other end is disposed farther (further in a negative X-axis direction) relative to the second driver pair assembly 106. In this manner, a first forward fastener driver 208 and a first aft fastener driver 214 may be disposed at different X-axis stations relative to the movable base 102 and relative to the second driver pair assembly 106. A first carrier arm yaw actuator 502 (FIGS. 5 and 7) may connect to the first carrier arm 202 to cause the first carrier arm 202 to yaw about the first carrier arm yaw axis 304. The first carrier arm yaw actuator 502 (FIGS. 5 and 7) may be a rotational actuator such as a hydraulic actuator, an electrical motor actuator, a linear actuator, or any actuator as desired. The first carrier arm yaw actuator 502 (FIGS. 5 and 7) is configured to rotate the first carrier arm 202 around a first carrier arm yaw axis 304 to position the first forward fastener driver 208 nearer or farther from the second forward fastener driver 222 and also to position the first aft fastener driver 214 farther or nearer from the second aft fastener driver 226.

The first forward fastener driver 208 and the first aft fastener driver 214 of the first carrier arm 202 can move away from each other in a Y-axis direction by sliding along the track 201 of the first carrier arm 202 or can move toward each other in the Y-axis direction by sliding along the track 201. The first forward support finger 204 may comprise a tab that connects to a first carrier travel actuator 504. The first aft support finger 210 may also comprise a tab that connects to the first carrier travel actuator 504. In further embodiments, only one of the first forward support finger 204 and the first aft support finger 210 comprises a tab that connects to the first carrier travel actuator 504 and an opposite end of the first carrier travel actuator 504 (FIGS. 5 and 7) connects to the movable base 102, so that only one of the first forward fastener driver 208 and the first aft fastener moves by sliding along the track 201 of the first carrier arm 202. The first carrier travel actuator 504 may be a hydraulic actuator, an electrical motor actuator, a linear actuator, or any actuator as desired. The direction of movement along the track 201 may be a first carrier arm travel path 306. As such, the first carrier arm 202 travel actuator may be a hydraulic arm extendible along a first carrier arm travel path 306 to move at least one of the first forward lifting actuator 206 and the first aft lifting actuator 212 toward and away from the other at least one of the first forward lifting actuator 206 and the first aft lifting actuator 212, slidably along the track 201 of the first carrier arm 202.

Finally, and as previously mentioned, the first forward lifting actuator 206 may be connected to the first forward fastener driver 208 and may operate to lift or lower the first forward fastener driver 208 in a first forward lifting actuator extension direction 308. The first forward lifting actuator extension direction 308 may be a Z-axis direction relative to the movable base 102. For instance, the first forward lifting actuator 206 may lift the first forward fastener driver 208 higher from the base and toward a vehicle overhead or may lower the first forward fastener driver 208.

Similarly, the first aft lifting actuator 212 may be connected to the first aft fastener driver 214 and may operate to lift or lower the first aft fastener driver 214 in a first aft lifting actuator extension direction 310. The first aft lifting actuator extension direction 310 may be a Z-axis direction relative to the movable base 102. For instance, the first aft lifting actuator 212 may lift the first aft fastener driver 214 higher from the movable base 102 and toward a vehicle overhead or may lower the first aft fastener driver 214.

As such, the first forward lifting actuator 206 may be a hydraulic arm extendable along a first forward lifting actuator extension direction 308 to raise and lower the first forward fastener driver 208 relative to the movable base 102. Similarly, the first aft lifting actuator 212 may be a hydraulic arm extendable along a first aft lifting actuator extension direction 310 to raise and lower the first aft fastener driver 214 relative to the movable base 102. In some instances, though traveling in a same general axial direction (e.g., less than 90 degrees angular difference in any direction), the first forward lifting actuator extension direction 308 and the first aft lifting actuator extension direction 310 are not parallel directions.

Focusing now on the second driver pair assembly 106, the second carrier arm 216 of the second driver pair assembly 106 can pitch about a second carrier arm pitch axis 312 so that one end is disposed higher (further in a positive Z-axis direction) and the other end is disposed lower (further in a negative Z-axis direction). The second carrier arm pitch actuator 404 (FIGS. 4 and 6) rotates the second carrier arm 216 around the second carrier arm pitch axis 312 to angle the second forward fastener driver 222 and the second aft fastener driver 226 relative to a horizontal plane. In this manner a second forward fastener driver 222 and a second aft fastener driver 228 may be disposed at different Z-axis elevations relative to the movable base 102. A second carrier arm pitch actuator 404 (FIGS. 4 and 6) may connect to the second carrier arm 216 to cause the second carrier arm 216 to pitch about the second carrier arm pitch axis 312. The second carrier arm pitch actuator 404 (FIGS. 4 and 6) may be a rotational actuator such as a hydraulic actuator, an electrical motor actuator, a linear actuator, or any actuator as desired.

The second carrier arm 216 of the second driver pair assembly 106 can yaw about a second carrier arm yaw axis 314 so that one end is disposed closer (further in a positive X-axis direction) and the other end is disposed farther (further in a negative X-axis direction) relative to the first driver pair assembly 104. In this manner, a second forward fastener driver 222 and a second aft fastener driver 228 may be disposed at different X-axis stations relative to the movable base 102 and relative to the first driver pair assembly 104. A second carrier arm yaw actuator 506 (FIGS. 5 and 7) may connect to the second carrier arm 216 to cause the second carrier arm 216 to yaw about the second carrier arm yaw axis 314. The second carrier arm yaw actuator 506 (FIGS. 5 and 7) may be a rotational actuator such as a hydraulic actuator, an electrical motor actuator, a linear actuator, or any actuator as desired. The second carrier arm yaw actuator 506 (FIGS. 5 and 7) is configured second rotate the second carrier arm 216 around a second carrier arm yaw axis 314 to position the first forward fastener driver 208 nearer or farther from the first forward fastener driver 208 and also to position the second aft fastener driver 226 farther or nearer from the first aft fastener driver 214.

The second forward fastener driver 222 and the second aft fastener driver 228 of the second carrier arm 216 can move away from each other in a Y-axis direction by sliding along the track 215 of the second carrier arm 216 or can move toward each other in the Y-axis direction by sliding along the track 215. The second forward support finger 218 may comprise a tab that connects to a second carrier travel actuator 508. The second aft support finger 224 may also comprise a tab that connects to the second carrier travel actuator 508. In further embodiments, only one of the second forward support finger 218 and the second aft support finger 224 comprise a tab that connects to the second carrier travel actuator 508 and an opposite end of the second carrier travel actuator 508 (FIGS. 5 and 7) connects to the movable base 102, so that only one of the second forward fastener driver 222 and the second aft fastener moves by sliding along the track 215 of the second carrier arm 216. The second carrier travel actuator 508 may be a hydraulic actuator, an electrical motor actuator, a linear actuator, or any actuator as desired. The direction of movement along the track 215 may be a second carrier arm travel path 316. As such, the second carrier arm 216 travel actuator may be a hydraulic arm extendible along a second carrier arm travel path 316 to move at least one of the second forward lifting actuator 220 and the second aft lifting actuator 226 toward and away from the other of least one of the second forward lifting actuator 220 and the second aft lifting actuator 226, slidably along the track 215 of the second carrier arm 216.

Finally, and as previously mentioned, the second forward lifting actuator 220 may be connected to the second forward fastener driver 222 and may operate to lift or lower the second forward fastener driver 222 in a second forward lifting actuator extension direction 318. The second forward lifting actuator extension direction 318 may be a Z-axis direction relative to the movable base 102. For instance, the second forward lifting actuator 220 may lift the second forward fastener driver 222 higher from the base and toward a vehicle overhead or may lower the second forward fastener driver 222.

Similarly, the second aft lifting actuator 226 may be connected to the second aft fastener driver 228 and may operate to lift or lower the second aft fastener driver 228 in a second aft lifting actuator extension direction 320. The second aft lifting actuator extension direction 320 may be a Z-axis direction relative to the movable base 102. For instance, the second aft lifting actuator 226 may lift the second aft fastener driver 228 higher from the movable base 102 and toward a vehicle overhead or may lower the second aft fastener driver 228.

As such, the second forward lifting actuator 220 may be a hydraulic arm extendable along a second forward lifting actuator extension direction 318 to raise and lower the second forward fastener driver 222 relative to the movable base 102. Similarly, the second aft lifting actuator 226 may be a hydraulic arm extendable along a second aft lifting actuator extension direction 320 to raise and lower the second aft fastener driver 226 relative to the movable base 102. In some instances, though traveling in a same general axial direction (e.g., less than 90 degrees angular difference in any direction), the second forward lifting actuator extension direction 318 and the second aft lifting actuator extension direction 320 are not parallel directions.

Referring now to FIGS. 1-7, one example embodiment of the disclosed fuel tank assembly system 2 may include a plurality of arms 202, 216 supported by a movable base 102. A plurality of fastener drivers 208, 214, 222, 228 may be spaced along each of the plurality of arms 202, 216. At least two fastener drivers are spaced along each arm. Actuators 402, 502, 504, 206, 212, 404, 506, 508, 220, 226 are connected to the arms to change at least two of (i) a spacing, (ii) an angle, and (iii) a height of each fastener driver 208, 214, 222, 228 relative to each other fastener driver. Finally, a tank support assembly 108 is disposed between at least two of the plurality of arms and configured to support a fuel tank while the fastener drivers 208, 214, 222, 228 drive fasteners to secure the fuel tank to a vehicle.

In various instances, the plurality of arms include a first arm 202 and a second arm 216 spaced apart on opposite sides of the tank support assembly 108. The plurality of fastener drivers are arranged with two fastener drivers 208, 214 spaced along the first arm 202 and two fastener drivers 222, 228 spaced along the second arm 216. The fastener drivers may be rotating drivers to drive screws or bolts or may be rivet guns. Because the first arm 202 and the second arm 216 are independently moveable, the system may be arranged to accommodate different fuel tanks for different vehicles and having different fastener arrangement patterns. In addition, the two fastener drivers 208, 214 spaced along the first arm may be independently movable by actuators 206, 212 relative to each other and the two fastener drivers 222, 228 spaced along the second arm may also be independently movable by actuators 220, 226 relative to each other.

Figure 8:
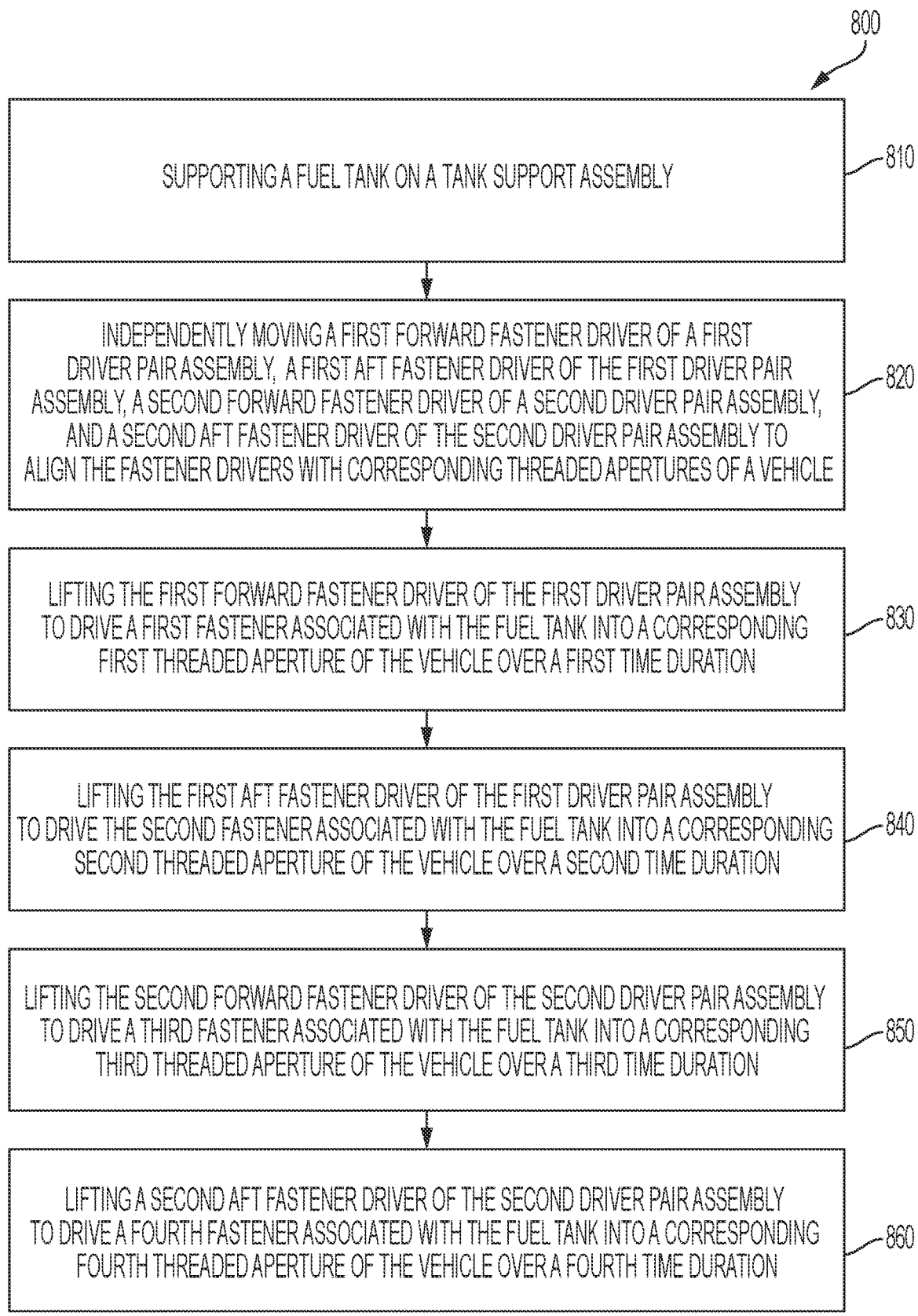
FIG. 8 illustrates a method of assembling a fuel tank to a vehicle by a fuel tank mounting system, in accordance with various embodiments.

Referring now to FIG. 8, a method of assembling a fuel tank to a vehicle 800 is provided. The method may be for assembling a fuel tank to a vehicle by a fuel tank mounting system having (i) a movable base that is movable along tracks, (ii) a first driver pair assembly attached to the base and configured to fasten a first plurality of fuel tank fasteners, (iii) a second driver pair assembly attached to the base and configured to fasten a second plurality of fuel tank fasteners, and (iv) a tank support assembly disposed between the first driver pair assembly and the second driver pair assembly and configured to support a fuel tank during fastening of the first plurality of fuel tank fasteners and the second plurality of fuel tank fasteners. The method may include supporting a fuel tank on the tank support assembly (block 810).

The method may also include independently moving a first forward fastener driver of the first driver pair assembly, a first aft fastener driver of the first driver pair assembly, a second forward fastener driver of the second driver pair assembly, and a second aft fastener driver of the second driver pair assembly to align (i) the first forward fastener driver with a corresponding first threaded aperture of a vehicle, (ii) the first aft fastener driver with a corresponding second threaded aperture of the vehicle, (iii) the second forward fastener driver with a corresponding third threaded aperture of the vehicle, and (iv) the second aft fastener driver with the corresponding fourth threaded aperture of the vehicle (block 820).

The method may include lifting aspects. For instance, the method may include lifting the first forward fastener driver of the first driver pair assembly to drive a first fastener associated with the fuel tank into the corresponding first threaded aperture of the vehicle over a first-time duration (block 830). The method may include lifting the first aft fastener driver of the first driver pair assembly to drive the second fastener associated with the fuel tank into a corresponding second threaded aperture of the vehicle over a second time duration (block 840). The method may include lifting the second forward fastener driver of the second driver pair assembly to drive a third fastener associated with the fuel tank into a corresponding third threaded aperture of the vehicle over a third time duration (block 850). The method may also include lifting a second aft fastener driver of the second driver pair assembly to drive a fourth fastener associated with the fuel tank into a corresponding fourth threaded aperture of the vehicle over a fourth time duration (block 860). In various embodiments, the first time duration, the second time duration, the third time duration, and the fourth time duration are at least partially temporally overlapping.

Exemplary embodiments of the disclosure have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. The systems, methods, and devices disclosed herein may be combined, substituted, modified, or otherwise altered across embodiments as desired. The disclosure is not limited to the systems and devices disclosed herein, but also methods of utilizing the systems and devices.

What is claimed is:

1. A fuel tank mounting system, comprising:
 a movable base having a frame that is movable along base tracks;
 a first driver pair assembly attached to the movable base and configured to fasten a first plurality of fuel tank fasteners;
 a second driver pair assembly attached to the movable base and configured to fasten a second plurality of fuel tank fasteners; and
 a tank support assembly disposed between the first driver pair assembly and the second driver pair assembly and configured to support a fuel tank during fastening of the first plurality of fuel tank fasteners and the second plurality of fuel tank fasteners.

2. The fuel tank mounting system according to claim 1, wherein the first driver pair assembly comprises:
 a first carrier arm having a first forward lifting actuator and a first aft lifting actuator disposed adjacent to opposite ends of the first carrier arm;
 a first forward fastener driver supported by the first forward lifting actuator and rotatable to drive a first fuel tank fastener during fastening of the fuel tank to a vehicle; and
 a first aft fastener driver supported by the first aft lifting actuator and rotatable to drive a second fuel tank fastener during fastening of the fuel tank to the vehicle.

3. The fuel tank mounting system according to claim 2, further comprising a first forward support finger comprising a flange securing the first forward lifting actuator to the first carrier arm slidably along a track.

4. The fuel tank mounting system according to claim 3, further comprising a first aft support finger comprising a flange securing the first aft lifting actuator to the first carrier arm slidably along the track.

5. The fuel tank mounting system according to claim 4, further comprising a first carrier arm travel actuator comprising a hydraulic arm extendable to move at least one of the first forward lifting actuator and the first aft lifting actuator toward and away the other at least one of the first forward lifting actuator and the first aft lifting actuator slidably along the track of the first carrier arm.

6. The fuel tank mounting system according to claim 2,
 wherein the first forward lifting actuator comprises a hydraulic arm extendable along a first forward lifting actuator extension direction to raise and lower the first forward fastener driver relative to the movable base, and
 wherein the first aft lifting actuator comprises a hydraulic arm extendable along a first aft lifting actuator extension direction to raise and lower the first aft fastener driver relative to the movable base.

7. The fuel tank mounting system according to claim 2, wherein the first forward lifting actuator extension direction and the first aft lifting actuator extension direction are not parallel directions.

8. The fuel tank mounting system according to claim 2, further comprising a first carrier arm pitch actuator comprising a hydraulic actuator configured to rotate the first carrier arm around a first carrier arm pitch axis to angle the first forward fastener driver and the first aft fastener driver relative to a horizontal plane.

9. The fuel tank mounting system according to claim 2, wherein the second driver pair assembly comprises:
 a second carrier arm having a second forward lifting actuator and a second aft lifting actuator disposed adjacent to opposite ends of the second carrier arm;
 a second forward fastener driver supported by the second forward lifting actuator and rotatable to drive a third fuel tank fastener during fastening of the fuel tank; and a second aft fastener driver supported by the second aft lifting actuator and rotatable to drive a fourth fuel tank fastener during fastening of the fuel tank.

10. The fuel tank mounting system according to claim 9, further comprising a first carrier arm yaw actuator comprising a hydraulic actuator configured to rotate the first carrier arm around a first carrier arm yaw axis to position the first forward fastener driver nearer or farther from the second forward fastener driver and to position the first aft fastener driver farther or nearer from the second aft fastener driver.

11. The fuel tank mounting system according to claim 1, wherein the tank support assembly comprises a tank lifting actuator and a tank platform, the tank lifting actuator selectably raising and lowering the tank platform relative to the movable base, wherein the tank platform comprises a boss structured and arranged to receive a fuel tank resting thereon and support the fuel tank for raising and lowering by the tank lifting actuator.

12. A fuel tank mounting system, comprising:
a plurality of arms supported by a movable base;
a plurality of fastener drivers spaced along each of the plurality of arms, wherein at least two fastener drivers are spaced along each arm of the plurality of arms;
a plurality of actuators connected to the arms to change at least one of (i) a spacing, (ii) an angle, or (iii) a height of each fastener driver relative to each other fastener driver; and
a tank support assembly disposed between at least two of the plurality of arms and configured to support a fuel tank while the fastener drivers drive fasteners to secure the fuel tank to a vehicle.

13. The fuel tank mounting system of claim 12, wherein the plurality of arms comprises a first arm and a second arm spaced apart on opposite sides of the tank support assembly.

14. The fuel tank mounting system of claim 13, wherein the plurality of fastener drivers comprises two fastener drivers spaced along the first arm and two fastener drivers spaced along the second arm.

15. The fuel tank mounting system of claim 14, wherein the fastener drivers comprise rivet guns.

16. The fuel tank mounting system of claim 14, wherein the fastener drivers comprise rotating drivers to drive screws or bolts.

17. The fuel tank mounting system of claim 14, wherein the first arm and the second arm are independently movable by actuators of the plurality of actuators.

18. The fuel tank mounting system of claim 17,
wherein the plurality of fastener drivers comprises two fastener drivers spaced along the first arm and independently movable by at least one actuator of the plurality of actuators relative to each other,
wherein the plurality of fastener drivers comprises two fastener drivers spaced along the second arm and independently movable by at least one actuator of the plurality of actuators relative to each other, and
wherein at least one actuator of the plurality of actuators independently moves the first arm and the second arm relative to each other.

19. A method of assembling a fuel tank to a vehicle by a fuel tank mounting system having (i) a movable base that is movable along tracks, (ii) a first driver pair assembly attached to the base and configured to fasten a first plurality of fuel tank fasteners, (iii) a second driver pair assembly attached to the base and configured to fasten a second plurality of fuel tank fasteners, and (iv) a tank support assembly disposed between the first driver pair assembly and the second driver pair assembly and configured to support a fuel tank during fastening of the first plurality of fuel tank fasteners and the second plurality of fuel tank fasteners, the method comprising:
supporting a fuel tank on the tank support assembly;
moving a first forward fastener driver of the first driver pair assembly, a first aft fastener driver of the first driver pair assembly, a second forward fastener driver of the second driver pair assembly, and a second aft fastener driver of the second driver pair assembly to align: (i) the first forward fastener driver with a corresponding first threaded aperture of a vehicle; (ii) the first aft fastener driver with a corresponding second threaded aperture of the vehicle; (iii) the second forward fastener driver with a corresponding third threaded aperture of the vehicle; and (iv) the second aft fastener driver with the corresponding fourth threaded aperture of the vehicle;
lifting the first forward fastener driver of the first driver pair assembly to drive a first fastener associated with the fuel tank into the corresponding first threaded aperture of the vehicle over a first time duration;
lifting the first aft fastener driver of the first driver pair assembly to drive the second fastener associated with the fuel tank into a corresponding second threaded aperture of the vehicle over a second time duration;
lifting the second forward fastener driver of the second driver pair assembly to drive a third fastener associated with the fuel tank into a corresponding third threaded aperture of the vehicle over a third time duration; and
lifting a second aft fastener driver of the second driver pair assembly to drive a fourth fastener associated with the fuel tank into a corresponding fourth threaded aperture of the vehicle over a fourth time duration.

20. The method according to claim 19, wherein the first time duration, the second time duration, the third time duration, and the fourth time duration are at least partially temporally overlapping.

* * * * *